(12) United States Patent
Okamoto et al.

(10) Patent No.: US 10,746,117 B2
(45) Date of Patent: Aug. 18, 2020

(54) VEHICLE CONTROL DEVICE

(71) Applicant: DENSO CORPORATION, Kariya, Aichi-pref. (JP)

(72) Inventors: Tsuyoshi Okamoto, Kariya (JP); Takayuki Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 15/761,013

(22) PCT Filed: Dec. 6, 2016

(86) PCT No.: PCT/JP2016/086199
§ 371 (c)(1),
(2) Date: Mar. 16, 2018

(87) PCT Pub. No.: WO2017/099065
PCT Pub. Date: Jun. 15, 2017

(65) Prior Publication Data
US 2018/0258874 A1    Sep. 13, 2018

(30) Foreign Application Priority Data

Dec. 11, 2015  (JP) .................... 2015-241958

(51) Int. Cl.
*F02D 41/06* (2006.01)
*B60K 6/485* (2007.10)
(Continued)

(52) U.S. Cl.
CPC ............ *F02D 41/068* (2013.01); *B60K 6/485* (2013.01); *B60K 6/54* (2013.01); *B60W 10/30* (2013.01);
(Continued)

(58) Field of Classification Search
CPC .. F02D 41/068; F02D 29/02; F02D 2200/021; F02D 2200/503; B60W 20/00;
(Continued)

(56) References Cited

U.S. PATENT DOCUMENTS 4,123,916 A  *  11/1978  Kreger ............... B60H 1/00007
                                                          62/243
4,384,608 A  *   5/1983  Scarlett ............. B60H 1/00007
                                                         137/625.43
(Continued)

FOREIGN PATENT DOCUMENTS

JP    2001263854 A   *  9/2001
JP    2004-270619 A     9/2004
(Continued)

OTHER PUBLICATIONS

Feb. 28, 2017 International Search Report issued in International Patent Application No. PCT/JP2016/086199.

Primary Examiner — Sizo B Vilakazi
Assistant Examiner — Brian R Kirby
(74) Attorney, Agent, or Firm — Oliff PLC

(57) ABSTRACT

A vehicle control device for a vehicle including an engine that is a power source of the vehicle, and a heating unit that heats a coolant of the engine includes a water temperature determination part that determines whether or not a temperature of the coolant is lower than a predetermined value, and a heating control part that performs an operation limitation to stop an output of the heating unit or to limit the output of the heating unit to a predetermined upper limit value or lower, when the water temperature determination part determines that the temperature of the coolant is lower than the predetermined value.

6 Claims, 4 Drawing Sheets

(51) Int. Cl.

| | |
|---|---|
| *B60K 6/54* | (2007.10) |
| *F01P 7/10* | (2006.01) |
| *F02D 29/02* | (2006.01) |
| *B60W 20/00* | (2016.01) |
| *B60W 10/30* | (2006.01) |
| *F01P 3/20* | (2006.01) |
| *F25B 30/02* | (2006.01) |
| *F01P 5/12* | (2006.01) |

(52) U.S. Cl.
CPC .............. *B60W 20/00* (2013.01); *F01P 3/20* (2013.01); *F01P 7/10* (2013.01); *F02D 29/02* (2013.01); *F25B 30/02* (2013.01); *B60W 2520/10* (2013.01); *B60W 2520/105* (2013.01); *B60W 2540/10* (2013.01); *B60W 2540/12* (2013.01); *B60W 2540/16* (2013.01); *F01P 2005/125* (2013.01); *F01P 2025/32* (2013.01); *F01P 2050/24* (2013.01); *F01P 2060/08* (2013.01); *F01P 2060/14* (2013.01); *F01P 2060/18* (2013.01); *F02D 2200/021* (2013.01); *F02D 2200/503* (2013.01); *Y02T 10/6226* (2013.01); *Y02T 10/6286* (2013.01)

(58) Field of Classification Search
CPC ............. B60W 10/30; B60W 2540/12; B60W 2540/10; B60W 2520/105; B60W 2520/10; B60W 2540/16; F01P 7/10; F01P 3/20; F01P 2060/14; F01P 2060/08; F01P 2005/125; F01P 2060/18; F01P 2025/32; F01P 2050/24; F25B 30/02; B60K 6/54; B60K 6/485; Y02T 10/6226; Y02T 10/6286
USPC .................................................. 701/101–113
See application file for complete search history.

(56) References Cited

U.S. PATENT DOCUMENTS

| | | | | |
|---|---|---|---|---|
| 4,458,498 | A * | 7/1984 | Kajino | F25B 30/06 165/240 |
| 5,497,941 | A * | 3/1996 | Numazawa | B60H 1/004 237/2 A |
| 5,918,668 | A * | 7/1999 | Trimble | F24D 19/1087 165/240 |
| 6,118,099 | A * | 9/2000 | Lake | B60H 1/00907 165/43 |
| 6,390,217 | B1 * | 5/2002 | O'Brien | B60K 11/04 160/DIG. 1 |
| 6,598,671 | B1 * | 7/2003 | Zeng | B60H 1/00735 165/202 |
| 6,928,831 | B2 * | 8/2005 | Heyl | B60H 1/00907 62/159 |
| 7,392,655 | B2 * | 7/2008 | Inaba | F02N 19/10 60/614 |
| 2003/0178010 | A1 * | 9/2003 | Pellizzari | F02M 45/086 123/549 |
| 2006/0005557 | A1 * | 1/2006 | Takano | B60H 1/3204 62/238.6 |
| 2007/0101737 | A1 * | 5/2007 | Akei | F25B 1/00 62/238.6 |
| 2007/0227472 | A1 * | 10/2007 | Takeuchi | F01P 9/06 123/41.19 |
| 2007/0283703 | A1 * | 12/2007 | Heckt | B60H 1/00907 62/3.61 |
| 2008/0276638 | A1 * | 11/2008 | Seefeldt | F25B 1/10 62/238.7 |
| 2009/0183697 | A1 * | 7/2009 | Inui | B60H 1/025 123/41.02 |
| 2009/0314847 | A1 * | 12/2009 | Nemoto | B60H 1/00885 237/5 |
| 2010/0076663 | A1 * | 3/2010 | Jinno | B60L 58/20 701/102 |
| 2010/0084112 | A1 * | 4/2010 | Piccard | B60H 1/00278 165/41 |
| 2010/0152938 | A1 * | 6/2010 | Aoki | B60K 6/445 701/22 |
| 2010/0243231 | A1 * | 9/2010 | Rosen | G05D 23/1904 165/237 |
| 2010/0312425 | A1 * | 12/2010 | Obayashi | B60W 20/10 701/22 |
| 2011/0016896 | A1 * | 1/2011 | Oomura | B60H 1/00785 62/155 |
| 2011/0146945 | A1 * | 6/2011 | Morita | B60H 1/034 165/51 |
| 2012/0017637 | A1 * | 1/2012 | Nakajo | B60H 1/00921 62/515 |
| 2012/0253573 | A1 * | 10/2012 | Shigyo | B60H 1/3213 701/22 |
| 2013/0079969 | A1 * | 3/2013 | Kamijo | B60K 6/445 701/22 |
| 2013/0144515 | A1 * | 6/2013 | Okamoto | F02D 45/00 701/113 |
| 2013/0211650 | A1 * | 8/2013 | Tashiro | B60W 20/00 701/22 |
| 2013/0299129 | A1 * | 11/2013 | Osaka | B60H 1/0005 165/59 |
| 2013/0305753 | A1 * | 11/2013 | Graaf | B60H 1/00007 62/115 |
| 2014/0014065 | A1 * | 1/2014 | Hayashi | F02D 29/02 123/339.1 |
| 2014/0075966 | A1 * | 3/2014 | Schmitz | B60H 1/00921 62/56 |
| 2014/0116673 | A1 * | 5/2014 | Kang | B60H 1/004 165/222 |
| 2014/0144997 | A1 * | 5/2014 | Eisenhour | B60H 1/2218 236/21 B |
| 2014/0250886 | A1 * | 9/2014 | Mizoguchi | F01K 23/101 60/663 |
| 2015/0025721 | A1 * | 1/2015 | Thompson | B60W 30/194 701/22 |
| 2015/0105957 | A1 * | 4/2015 | Okamoto | B60W 20/15 701/22 |
| 2015/0107345 | A1 * | 4/2015 | Sugimoto | F01P 11/16 73/114.68 |
| 2015/0121847 | A1 * | 5/2015 | Pursifull | F02D 9/04 60/274 |
| 2015/0158369 | A1 * | 6/2015 | Greiner | F25D 17/067 62/89 |
| 2015/0183296 | A1 * | 7/2015 | Ragazzi | B60H 1/2221 219/205 |
| 2015/0298522 | A1 * | 10/2015 | Hirabayashi | B60H 1/00314 701/36 |
| 2015/0330351 | A1 * | 11/2015 | Ragazzi | F02N 19/10 123/552 |
| 2016/0001636 | A1 * | 1/2016 | Terada | F25B 5/02 62/160 |
| 2016/0273435 | A1 * | 9/2016 | Hussain | F01N 9/00 |

FOREIGN PATENT DOCUMENTS

| | | | |
|---|---|---|---|
| JP | 2007-283830 A | 11/2007 | |
| JP | 2009-180103 A | 8/2009 | |
| JP | 2013160058 A * | 8/2013 | ............ B60W 10/30 |

* cited by examiner

US 10,746,117 B2

VEHICLE CONTROL DEVICE

CROSS REFERENCE TO RELATED APPLICATION

This application is based on Japanese Patent Application No. 2015-241958 filed on Dec. 11, 2015, the disclosure of which is incorporated herein by reference.

TECHNICAL FIELD

The present disclosure relates to a vehicle control device provided with an engine that is a power source of a vehicle and a heating unit that heats a coolant of the engine.

BACKGROUND ART

In recent years, a hybrid vehicle that is mounted with an engine and a motor as a power source of a vehicle has attracted attention from a social demand of a low fuel consumption and a low exhaust emission. In a hybrid vehicle of this kind, there is provided a vehicle that improves a fuel consumption by an EV traveling in which the engine is stopped and in which the vehicle is made to travel by a power of the motor. However, when a period of time in which the engine is driven is elongated so as to ensure an amount of heat for heating a vehicle compartment (that is, an amount of heat of a coolant of the engine) in the winter, the fuel consumption tends to be made worse.

Then, as described in Patent Document 1, there is provided a vehicle mounted with the engine and a heating unit that heats a coolant. The vehicle of this kind includes a heat pump as the heating unit that heats the coolant and reduces a rotational speed of a compressor of the heat pump as a temperature of the coolant and a load of the engine become higher, thereby inhibiting an increase in a power consumption of the heat pump.

PRIOR ART DOCUMENT

Patent Document

Patent Document 1: JP 2007-283830 A

In a technology described in the Patent Document 1, as the temperature of the coolant is lower, the rotational speed of the compressor of the heat pump is made higher to thereby increase an output of the heat pump. If the output of the heat pump is made larger when the temperature of the coolant is low, the coolant temperature can be quickly increased (that is, a warming-up of the engine can be accelerated). However, a temperature difference between an engine main body and the coolant is made smaller by an increase in the temperature of the coolant by the heat pump, so an amount of heat transferred from the engine to the coolant is decreased and an amount of heat radiated from the engine to the atmosphere is increased. An amount of heat to be wasted is increased by that amount and hence the heat pump needs to do an extra work, which hence increases a power consumption of the heat pump and increases a fuel consumption. For this reason, if the output of the heat pump is made larger when the temperature of the coolant is low, a fuel increase caused by an increase in the power consumption of the heat pump is made larger than a fuel decrease caused by accelerating the warming-up of the engine, which is likely to make the fuel consumption worse.

SUMMARY OF INVENTION

It is an objective of the present disclosure to provide a vehicle control device that can improve a fuel consumption of a system provided with a heating unit that heats a coolant of an engine.

To achieve the objective, in an aspect of the present disclosure, a vehicle control device for a vehicle including an engine that is a power source of the vehicle, and a heating unit that heats a coolant of the engine includes a water temperature determination part that determines whether or not a temperature of the coolant is lower than a predetermined value, and a heating control part that performs an operation limitation to stop an output of the heating unit or to limit the output of the heating unit to a predetermined upper limit value or lower, when the water temperature determination part determines that the temperature of the coolant is lower than the predetermined value.

According to this construction, in a case where it is determined that the temperature of the coolant is lower than the predetermined value, an operation limitation in which the output of the heating unit is stopped or is limited to the upper limit value or lower can be performed. In this way, as compared with a case where the operation limitation of the heating unit is not performed, an increase in the coolant temperature by the heating unit can be inhibited and an amount of heat transferred from the engine to the coolant can be increased, which hence can decrease an amount of heat radiated from the engine to the atmosphere. By that amount, an amount of heat to be wasted can be decreased and a fuel efficiency can be improved.

BRIEF DESCRIPTION OF THE DRAWINGS

The above and other objects, features and advantages of the present disclosure will become more apparent from the following detailed description made with reference to the accompanying drawings. In the drawings.

EMBODIMENT FOR CARRYING OUT INVENTION

Figure 1:
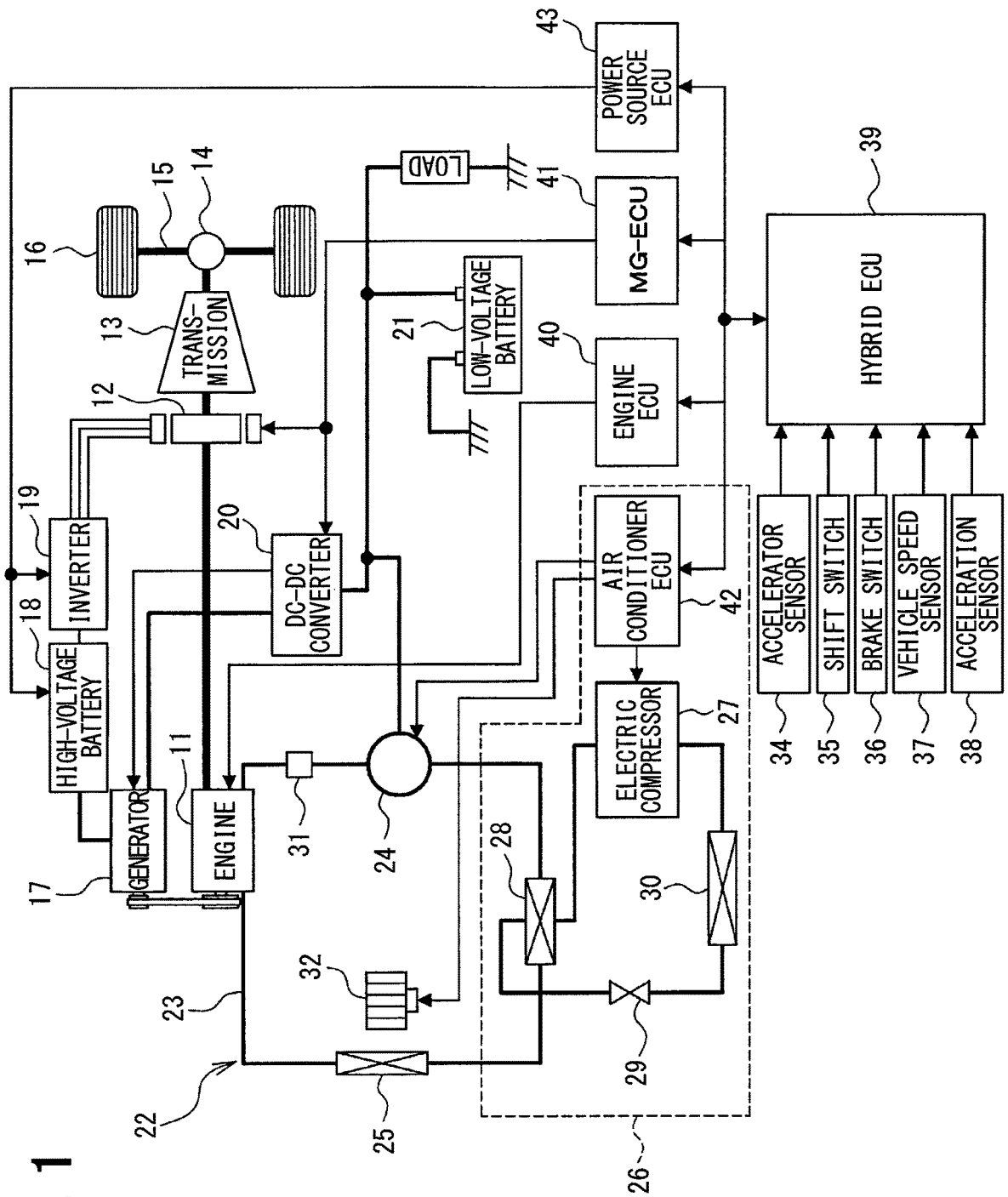
FIG. 1 is a drawing to show a general construction of a control system of a hybrid vehicle in an embodiment.

Hereinafter, an embodiment will be described. A general construction of a control system of a hybrid vehicle will be described on the basis of FIG. 1. An engine 11 of an internal combustion engine and a motor generator (hereinafter denoted as "MG") 12 are mounted as a power source of a vehicle. A power of an output shaft (that is, a crankshaft) of the engine 11 is transmitted to a transmission 13 via the MG 12. The power of the output shaft of the transmission 13 is transmitted to wheels 16 (that is, drive wheels) via a differential gear mechanism 14 and an axle 15. The transmission 13 may be a stepped transmission, which stepwise changes a shift step from among a polarity of shift steps, or a continuously variable transmission (that is, CVT) which continuously changes a speed.

A rotary shaft of the MG 12 is coupled between the engine 11 and the transmission 13 of a power transmission path, through which the power of the engine 11 is transmitted to the wheels 16, in such a way as to be capable of performing a power transmission. In this regard, a clutch for intermittently performing the power transmission may be interposed between the engine 11 and the MG 12 (or between the MG 12 and the transmission 13).

An electric power generated by a generator 17 driven by the power of the engine 11 is charged to a high-voltage battery 18. Further, an inverter 19 to drive the MG 12 is connected to the high-voltage battery 18, and the MG 12 receives or gives the electric power from or to the high-voltage battery 18 via the inverter 19. The generator 17 has a low-voltage battery 21 connected thereto via a DC-DC converter 20.

Each of the high-voltage battery 18 and the low-voltage battery 21 is a battery capable of being charged with and discharging electricity, and the DC-DC converter 20 is connected between the high-voltage battery 18 and the low-voltage battery 21. Further, the DC-DC converter 20 has a low-voltage load connected thereto, the low-voltage battery consuming electricity supplied from the high-voltage battery 18 via the DC-DC converter 20 or consuming electricity supplied from the low-voltage battery 21.

Further, a hot-water heating device 22 to use heat of a coolant of the engine 11 is mounted as a heating device for heating an interior of a vehicle compartment. In the hot-water heating device 22, a coolant circuit 23 for heating is connected to a coolant passage (that is, a water jacket) of the engine 11. The coolant circuit 23 is provided with an electric water pump 24 and a heater core 25 for heating. Further, the coolant circuit 23 is provided with a heater 28 of a heat pump 26 to heat the coolant.

The electric water pump 24 is driven by the electricity of the low-voltage battery 21 and the coolant is circulated among the engine 11, the heater 28, and the heater core 25 by the electric water pump 24. The heater 28 is a heat exchanger of the heat pump 26 and exchanges heat between a refrigerant and the coolant to thereby heat the coolant. The heater core 25 exchanges heat between the coolant and air to thereby heat the air.

In the heat pump 26, the following operations are performed: that is, a gas refrigerant of low temperature and low pressure is compressed by an electric compressor 27, thereby being brought into a gas refrigerant of low temperature and low pressure; then, heat is radiated from the gas refrigerant of high temperature and high pressure by the heater 28, thereby being brought into a liquid refrigerant of high pressure; then, the liquid refrigerant of high pressure is reduced in pressure and is expanded by an expansion valve 29, thereby being brought into a liquid refrigerant of low temperature and low pressure; and then, the liquid refrigerant of low temperature and low pressure has heat absorbed by another liquid refrigerant of low temperature and low temperature in an outdoor heat exchanger 30, thereby being brought into a gas refrigerant of low temperature and low pressure. This heat pump 26 corresponds to a "heating unit".

The coolant circuit 23 is provided with an outlet water temperature sensor 31 to sense an engine outlet water temperature that is a temperature of the coolant flowing out of the engine 11. A blower fan 32 to generate a warm wind is arranged near the heater core 25.

Further, an accelerator opening (that is, an operation amount of an accelerator pedal) is sensed by an accelerator sensor 34. An operating position of a shift lever is detected by a shift switch 35. A braking operation is detected by a brake switch 36 (or an operation amount of a brake is sensed by a brake sensor). A vehicle speed is sensed by a vehicle speed sensor 37. An acceleration is sensed by an acceleration sensor 38.

A hybrid ECU 39 is a control device that comprehensively controls the whole of the vehicle and reads output signals of various kinds of sensors and switches described above, thereby detecting an operating state. This hybrid ECU 39 sends or receives a control signal and a data signal among an engine ECU 40, an MG-ECU 41, and an air conditioner ECU 42.

An engine ECU 40 is a control device that controls an operation of the engine 11. The MG-ECU 41 is a control device that controls an inverter 19 to thereby control the MG 12 and that controls the generator 17 and the DC-DC converter 20. An air conditioner ECU 42 is a control device that controls the hot-water heating device 22 (for example, the electric water pump 24, the electric compressor 27, and a blower fan 32).

The hybrid ECU 39 controls the engine 11, the MG 12, the generator 17, the DC-DC converter 20, and the hot-water heating device 22 by the respective ECUs 40 to 42 according to the operating state of the vehicle. Further, the hybrid ECU 39 sends or receives a control signal and a data signal also to or from the power source ECU 43 that monitors the high-voltage battery 18.

At this time, the hybrid ECU 39 switches a traveling mode, for example, among an engine traveling mode, an assistance traveling mode, and an EV traveling mode. In the engine traveling mode, the hybrid ECU 39 performs an engine travelling in which the hybrid ECU 39 drives the wheels 16 only by the power of the engine 11 to thereby make the vehicle travel. In the assistance traveling mode, the hybrid ECU 39 performs an assistance traveling in which the hybrid ECU 39 drives the wheels 16 by both of the power of the engine 11 and the power of the MG 12 to thereby make the vehicle travel. In the EV traveling mode, the hybrid ECU 39 performs an EV traveling in which the hybrid ECU 39 drives the wheels 16 only by the power of the MG 12 to thereby make the vehicle travel.

Further, the hybrid ECU 39 switches the traveling mode to a regenerative power generation mode at the time of braking the vehicle (for example, at the time of generating a braking force when an accelerator is turned off or when a brake is turned on). In this regenerative power generation mode, the hybrid ECU 39 performs a regenerative power generation in which the hybrid ECU 39 drives the MG 12 by the power of the wheels 16 to thereby transform a kinetic energy of the vehicle into an electric energy by the MG 12 and charges a regenerative electricity, which is electricity generated in this way, to the high-voltage battery 18. In this way, it is possible to elongate a period of time in which the assistance traveling and the EV traveling can be performed and hence to improve a fuel consumption.

Figure 2:
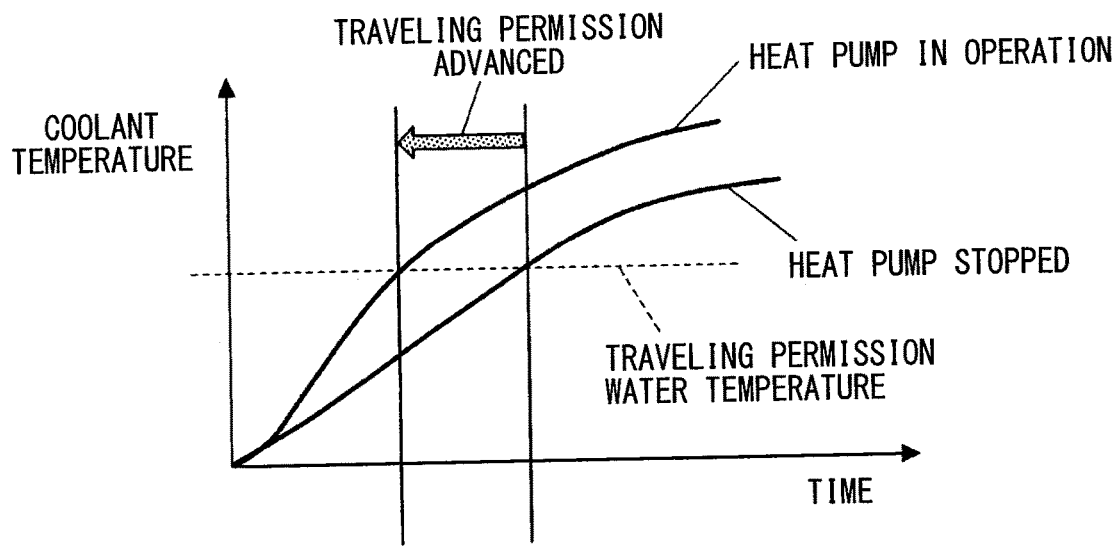
FIG. 2 is a time chart to show a behavior of a coolant temperature when a heat pump is in operation and when the heat pump is stopped.
Figure 3:
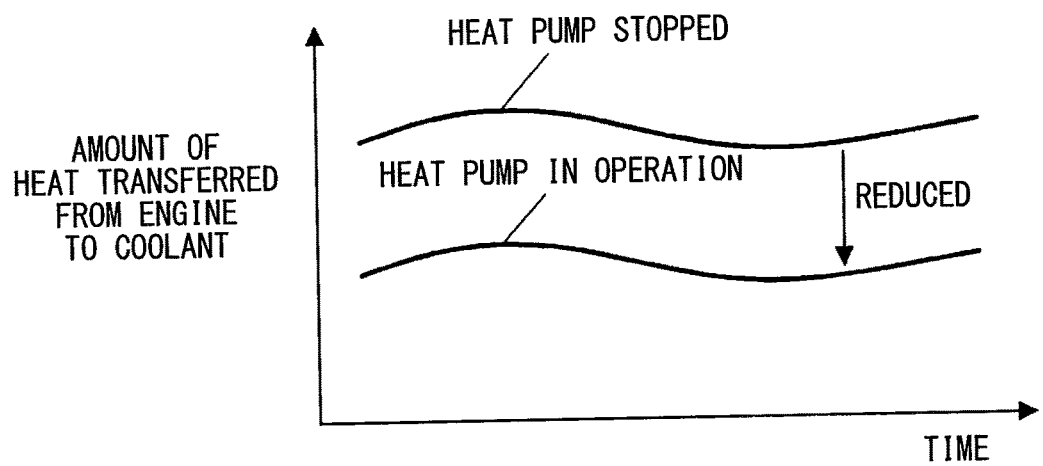
FIG. 3 is a time chart to show a behavior of an amount of heat transferred from the engine to the coolant when the heat pump is operated and when the heat pump is stopped.

Incidentally, when the coolant of the engine 11 is heated by the heat pump 26, an engine inlet water temperature (that is, a temperature of the coolant flowing into the engine 11) is increased and, of a waste heat of the engine 11, an amount of heat transferred to the coolant is decreased and an amount of heat radiated to the atmosphere is increased. This is because of the following reasons: a temperature difference between an engine body temperature and the engine inlet water temperature is reduced and the amount of heat transferred from the engine 11 to the coolant is proportional to the temperature difference. When the heat pump 26 is used, as shown in FIG. 2, the temperature of the coolant is quickly increased, but as shown in FIG. 3, the amount of heat transferred from the engine 11 to the coolant is decreased and the amount of heat radiated from the engine 11 to the atmosphere is increased. Hence, an amount of heat to be wasted is increased by that amount and hence the heat pump 26 needs to do an extra work, which hence increases a power consumption of the heat pump 26 and increases a fuel consumption.

The fuel efficiency effect is determined by a difference between a fuel decrease caused by warming the coolant at an early stage and a fuel increase caused by using the fuel for warming the coolant. When the fuel is used more for warming the coolant, the fuel efficiency effect is reduced. When the heat pump 26 is used from a low temperature, the fuel increase becomes larger than the fuel decrease and hence the fuel efficiency is likely to be impaired. In this regard, as shown in FIG. 2, a main improvement in the fuel efficiency caused by warming the coolant from an early stage is caused by advancing a permission of the EV traveling, and a decrease in a friction loss caused by an effect of warming up an engine main body is small.

Figure 4:
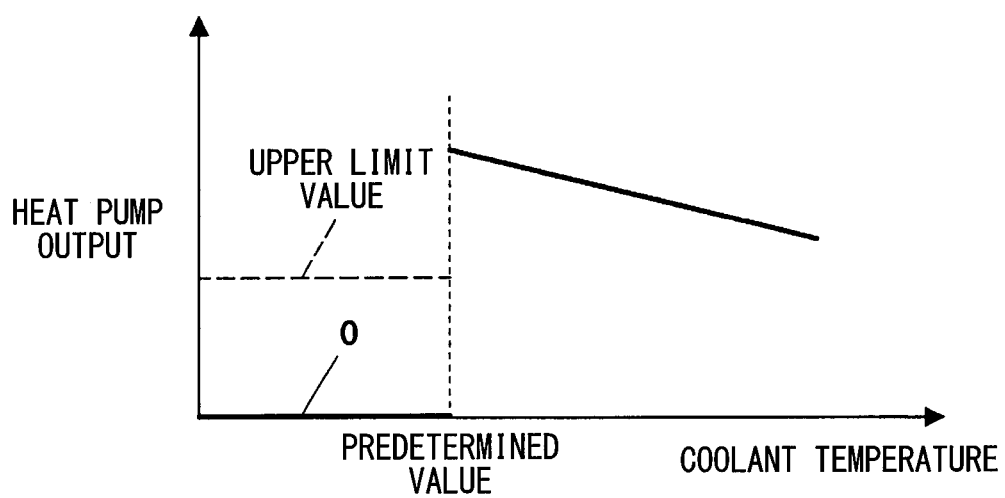
FIG. 4 is a graph to illustrate an operation limitation of the heat pump in the embodiment.
Figure 5:
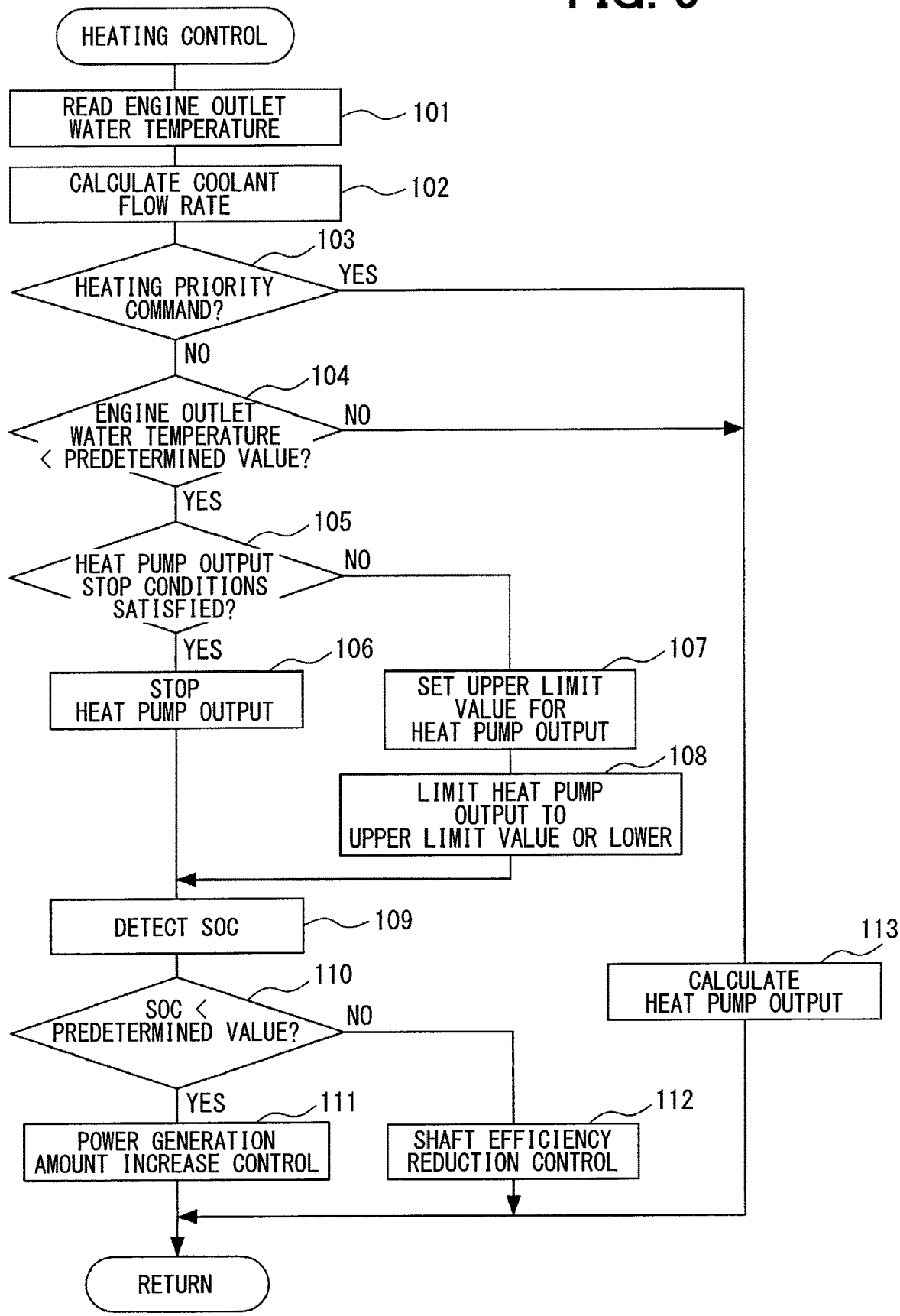
FIG. 5 is a flow chart to show a flow of a processing of a heating control routine in the embodiment.

Then, in the present embodiment, the following control is performed by executing a heating control routine shown in FIG. 5, which will be described later, by the hybrid ECU 39. For example, as shown in FIG. 4, it is determined whether or not the temperature of the coolant is lower than a predetermined value (for example, a warming-up completion water temperature at which the engine can be stopped), and in a case where it is determined that the temperature of the coolant is lower than the predetermined value, an operation limitation is performed in which an output of the heat pump 26 is stopped or is limited to a predetermined upper limit value or lower. In this way, as compared with a case where the operation limitation of the heat pump 26 is not performed, an increase in the coolant temperature by the heat pump 26 is inhibited and an amount of heat transferred from the engine 11 to the coolant is increased and an amount of heat radiated from the engine 11 to the atmosphere is decreased. By the amount of heat to be reduced, the amount of heat to be wasted is reduced and the fuel consumption is improved.

Here, in a case where a heat radiation from the engine 11 to the atmosphere (for example, a degree of easiness of radiating heat)) is high (for example, in a case where a volume of wind flowing into an engine room is large), when the temperature of the coolant is increased by the heat pump 26, an amount of heat radiated from the engine 11 to the atmosphere (that is, an amount of heat to be wasted) is likely to be increased. On the other hand, in a case where the heat radiation from the engine 11 to the atmosphere is low, even if the temperature of the coolant is increased by the heat pump 26, the amount of heat radiated from the engine 11 to the atmosphere (that is, the amount of heat to be wasted) is not increased as compared with a case where the heat radiation from the engine 11 to the atmosphere is high.

In consideration of a characteristic like this, in the present embodiment, when it is determined whether or not the heat radiation from the engine 11 to the atmosphere is high and the operation limitation of the heat pump 26 is performed, according to a determination result of the heat radiation from the engine 11 to the atmosphere, it is determined whether to stop the output of the heat pump 26 or limit the output of the heat pump 26 to the upper limit value or lower.

Specifically, in a case where the heat radiation from the engine 11 to the atmosphere is high, it is determined that when the temperature of the coolant is increased by the heat pump 26, the amount of heat radiated from the engine 11 to the atmosphere is likely to be greatly increased and hence the output of the heat pump 26 is stopped. On the other hand, in a case where the heat radiation from the engine 11 to the atmosphere is not high, it is determined that even if the temperature of the coolant is increased by the heat pump 26, the amount of heat radiated from the engine 11 to the atmosphere is not increased as compared with a case where the heat radiation from the engine 11 to the atmosphere is high, and hence the output of the heat pump 26 is limited to the upper limit value or lower.

Next, there will be described the reason why the heat pump 26 is required irrespective of performing the operation limitation of the heat pump 26 when the temperature of the coolant is low. Until the temperature of the coolant is increased to the predetermined value (for example, the warming-up completion water temperature at which the engine can be stopped) from the time when the temperature of the coolant is lower than the predetermined value, the operation limitation of the heat pump 26 needs to be performed, but after the time, when the heat pump 26 is used, the fuel consumption can be more improved. An improvement in the fuel consumption is caused by elongating an EV traveling time. The reason why the fuel consumption is improved when the heat pump 26 is used after the temperature of the coolant is the warming-up completion water temperature or higher, is that the heat of the heat pump 26 is used not for warming-up the engine 11 but for heating air in the vehicle compartment. When all of the heat generated by the heat pump 26 is used for heating the air in the vehicle compartment, the engine inlet water temperature is not increased. For this reason, even if the heat pump 26 is used, a waste heat of the engine 11 is not changed. When the heat pump 26 is not used, heat required to heat the air in vehicle compartment needs to be supplied only by the engine 11, so that the engine 11 cannot be stopped. That is, the EV traveling cannot be performed and hence the fuel consumption is made worse. Hence, even if the heat pump 26 is stopped when the temperature of the coolant is low (that is, at the time of warming-up the engine 11), the heat pump 26 is required in order to improve the fuel efficiency by using the heat pump 26 for heating the air in the vehicle compartment.

Hereinafter, a processing content of the heating control routine shown in FIG. 5 executed by the hybrid ECU 39 in the present embodiment will be described. The heating control routine shown in FIG. 5 is executed repeatedly at predetermined intervals during a period in which the power of the hybrid ECU 39 is on and plays a role of "a heating control part".

When the present routine is invoked, first, in step 101, the engine outlet water temperature sensed by the outlet water temperature sensor 31 is read. Then, the routine proceeds to step 102 where a flow rate of the coolant flowing in the coolant circuit 23 is calculated by a map or a mathematical expression according to a rotational speed of the electric water pump 24. The map or the mathematical expression of the coolant flow rate is set in such a way that as the rotational speed of the electric water pump 24 is higher, the coolant flow rate becomes larger.

Then, the routine proceeds to step 103 whether or not a heating priority command is given. This heating priority command is not a fuel priority command but a comfortability priority command. In this case, for example, whether or not the heating priority command is given is determined by whether or not a heating priority switch to be pressed by a user is in a pressed state. Alternatively, whether or not the heating priority command is given may be determined by whether or not a fuel consumption priority switch (for example, an economic switch) is in a released state. A processing of this step 103 plays a role of "a heating priority determination part."

In a case where it is determined in this step 103 that the heating priority command is given, the routine proceeds to step 113. In this step 113, the output of the heat pump 26 is calculated according to the temperature and the flow rate of the coolant. Specifically, the output [kW] of the heat pump 26 is calculated from the following expression (1) by the use of a target heating water temperature [K], the engine outlet water temperature [K], the coolant flow rate [kg/s] and a specific heat [kJ/kg/K] of the coolant.

$$\text{Heat pump output} = (\text{target heating water temperature} - \text{engine outlet water temperature}) \times \text{flow rate} \times \text{specific heat} \quad (1)$$

In contrast to this, in a case where it is determined in the step 103 that the heating priority command is not given, the routine proceeds to step 104. In this step 104, it is determined whether or not the engine outlet water temperature is lower than a predetermined value. Here, the predetermined value is set, for example, at the warming-up completion water temperature (for example, 40° C.) in which the engine can be stopped. When the engine outlet water temperature is increased to the predetermined value or higher, the EV traveling is permitted in which the engine 11 is stopped and in which the vehicle is made to travel by the power of the MG 12. A processing of this step 104 plays a role of "a water temperature determination part".

In a case where it is determined in this step 104 that the engine outlet water temperature is lower than the predetermined value, the operation limitation of the heat pump 26 is performed in the following manner. First, in step 105, it is determined, for example, by the following conditions (1) to (3) whether or not an output stop condition of the heat pump 26 is satisfied.

(1) A grille shutter to regulate an amount of wind to be sent to an engine room or a radiator shutter to regulate an amount of wind to be sent to a radiator is closed (for example, is set to a side closer to a closed position than a fully opened position). (2) An ambient temperature of the engine room is higher than a predetermined value (for example, a value set according to the engine output water temperature). (3) A flow rate of the coolant flowing in an engine main body is a predetermined value or lower (for example, a fixed value set in advance).

These conditions of (1) to (3) are conditions by which it is determined whether or not the heat radiation (for example, a degree of easiness of radiating heat) from the engine 11 to the atmosphere is high. In a case where none of the conditions of (1) to (3) are satisfied, it is determined that the heat radiation from the engine 11 to the atmosphere is high and it is determined that an output stop condition of the heat pump 26 is satisfied. On the other hand, in a case where any one of the conditions of (1) to (3) is satisfied, it is determined that the heat radiation from the engine 11 to the atmosphere is not high (that is, low) and it is determined that the output stop condition of the heat pump 26 is not satisfied. A processing of this step 105 plays a role of "a heat radiation determination part".

In this regard, if an auxiliary heater that warms a human body directly or by a radiant heat, such as a sheet heater or a carbon heater, is provided, the following condition (4) may be additionally used. (4) An output of the auxiliary heater is lower than a predetermined value (for example, a value set according to an outside air temperature). In this case, in a case where none of the conditions (1) to (4) are satisfied, it is determined that the output stop condition of the heat pump 26 is satisfied. On the other hand, any one of the conditions (1) to (4) is satisfied, it is determined that the output stop condition of the heat pump 26 is not satisfied.

In a case where it is determined in this step 105 that the output stop condition of the heat pump 26 is satisfied, the routine proceeds to step 106. In this step 106, the heat pump 26 is held in a state where the output of the heat pump 26 is stopped.

On the other hand, in a case where it is determined in the step 105 that the output stop condition of the heat pump 26 is not satisfied, the routine proceeds to step 107. In this step 107, an upper limit value of the output of the heat pump 26 is set in the following manner.

In a case where the above condition (1) is satisfied, the upper limit value is set (that is, calculated) by the map or the mathematical expression according to the opening degree of the grille shutter or the radiator shutter. In this case, the map or the mathematical expression of the upper limit value is set in such a way that as the opening degree is smaller, the upper limit value becomes higher.

In a case where the above condition (2) is satisfied, the upper limit value is set (that is, calculated) by the map or the mathematical expression according to the ambient temperature in the engine room. In this case, the map or the mathematical expression of the upper limit value is set in such a way that as the ambient temperature is higher, the upper limit value becomes higher.

In a case where the above condition (3) is satisfied, the upper limit value is set (that is, calculated) by the map or the mathematical expression according to the coolant flow rate. In this case, the map or the mathematical expression of the upper limit value is set in such a way that as the coolant flow rate is smaller, the upper limit value becomes higher.

In a case where the above condition (4) is satisfied, the upper limit value is set (that is, calculated) by the map or the mathematical expression according to an output of the auxiliary heater. In this case, the map or the mathematical expression of the upper limit value is set in such a way that as the output of the auxiliary heater is smaller, the upper limit value becomes higher.

Then, the routine proceeds to step 108 where the output of the heat pump 26 is calculated by the use of the above expression (1) and where the output of the heat pump 26 is limited to the upper limit value or lower. Specifically, in a case where the output of the heat pump 26, which is calculated by the use of the expression (1) described above, is the upper limit value or lower, the output of the heat pump 26 is employed as it is. In contrast to this, in a case where the output of the heat pump 26, which is calculated by the use of the expression (1) described above, is higher than the upper limit value, the output of the heat pump 26 is set to the upper limit value.

In this way, after starting the operation limitation of the heat pump 26, the routine proceeds to step 109 where an SOC to indicate a remaining capacity of the high-voltage battery 18 is detected. The SOC is defined, for example, by the following expression.

$$SOC = \text{remaining capacity/fully charged capacity} \times 100$$

Then, the routine proceeds to step 110 where it is determined whether or not the SOC of the high-voltage battery 18 is lower than a predetermined value. The predetermined value is set at a value between an allowable lower limit value and an allowable upper limit value of the SOC (for example, a value slightly higher than the allowable lower limit value of the SOC).

In a case where it is determined in this step 110 that the SOC of the high-voltage battery 18 is lower than the predetermined value, the routine proceeds to step 111. In this step 111, a power generation amount increase control is performed. In this power generation amount increase control, the output of the engine 11 is increased to thereby increase an amount of power generation of the generator 17 driven by the power of the engine 11 and to thereby increase an amount of waste heat generated by the engine 11. A processing of this step 111 plays a role of "a power generation amount increase control part".

On the other hand, in a case where it is determined in the step 110 that the SOC of the high-voltage battery 18 is the predetermined value or higher, the routine proceeds to step 112. In this step 112, a shaft efficiency reduction control is performed. In this shaft efficiency reduction control, a shaft efficiency that is a ratio of a shaft output to an amount of fuel consumed by the engine 11 is reduced to thereby increase a waste heat generation efficiency that is a ratio of the amount of waste heat generated by the engine 11 to the amount of fuel consumed by the engine 11 (that is, to thereby increase a cooling loss). In this case, for example, by increasing a rotational speed without changing the output of the engine 11 or by delaying an ignition timing, the shaft efficiency is reduced. A processing of this step 112 plays a role of "a shaft efficiency reduction control part".

After the operation limitation of the heat pump 26 is started, in a case where it is determined in the step 103 that the heating priority command is given, the operation limitation of the heat pump 26 is released and the power generation amount increase control and the shaft efficiency reduction control are finished. In this case, the routine proceeds to step 113 where the output of the heat pump 26 is calculated by the use of the expression (1).

Further, after the operation limitation of the heat pump 26 is started, in a case where it is determined in the step 104 that the engine outlet water temperature is the predetermined value or higher, the operation limitation of the heat pump 26 is released and the power generation amount increase control and the shaft efficiency reduction control are finished. In this case, the routine proceeds to step 113 where the output of the heat pump 26 is calculated by the use of the expression (1).

In the present embodiment described above, in a case where it is determined that the temperature of the coolant (for example, the engine outlet water temperature) is lower than the predetermined value, the operation limitation is performed in which the output of the heat pump 26 is stopped or is limited to the upper limit value or lower. In this way, as compared with a case where the operation limitation of the heat pump 26 is not performed, an increase in the coolant temperature by the heat pump 26 can be inhibited, and the amount of heat transferred from the engine 11 to the coolant can be increased, and the amount of heat radiated from the engine 11 to the atmosphere can be decreased. Hence, by the amount of heat to be reduced, the amount of heat to be wasted can be reduced and hence the fuel consumption can be improved.

Further, in the present embodiment, in a case where it is determined that the temperature of the coolant is the predetermined value or higher, the operation limitation of the heat pump 26 is released. In this way, in a case where the temperature of the coolant is the predetermined value or higher, the amount of heat for heating (that is, the amount of heat of the coolant) can be secured by the heat pump 26 that is the heating unit other than the engine 11, which hence makes it possible to perform the EV traveling in which the engine 11 is stopped and in which the vehicle is made to travel by the use of the power of the MG 12.

Still further, in the present embodiment, even if the temperature of the coolant is lower than the predetermined value, in a case where it is determined that the heating priority command is given, the operation limitation of the heat pump 26 is released. In this way, in a case where the heating priority command is given, by quickly increasing the temperature of the coolant, the amount of heat for heating (that is, the amount of heat of the coolant) can be secured to thereby improve comfortability.

Still further, in the present embodiment, when it is determined whether or not the heat radiation from the engine 11 to the atmosphere is high and the operation limitation of the heat pump 26 is performed, according to a determination result of the heat radiation from the engine 11 to the atmosphere, it is determined whether the output of the heat pump 26 is stopped or is limited to the upper limit value or lower.

Specifically, in a case where it is determined that the heat radiation from the engine 11 to the atmosphere is high, it is determined that when the temperature of the coolant is increased by the heat pump 26, the amount of heat radiated from the engine 11 to the atmosphere is likely to increase greatly and hence the output of the heat pump 26 is stopped. In this way, an increase in the amount of heat to be radiated from the engine 11 to the atmosphere (that is, the amount of heat to be wasted) can be prevented.

On the other hand, in a case where it is determined that the heat radiation from the engine 11 to the atmosphere is not high, it is determined that even if the temperature of the coolant is increased by the heat pump 26, the amount of heat radiated from the engine 11 to the atmosphere does not increase as compared with a case where the heat radiation from the engine 11 to the atmosphere is high, and hence the output of the heat pump 26 is limited to the upper limit value or lower. In this way, the amount of heat to be radiated from the engine 11 to the atmosphere (that is, the amount of heat to be wasted) can be inhibited from being increased and at the same time the temperature of the coolant can be quickly increased by both of the heat pump 26 and the engine 11.

Further, in the present embodiment, in a case where the operation limitation of the heat pump 26 is performed and where the SOC of the high-voltage battery 18 is lower than the predetermined value, the power generation increase control is performed. In this power generation increase control, the output of the engine 11 is increased to thereby increase the amount of electric power generated by the generator 17 driven by the power of the engine 11 and to thereby increase the amount of heat wasted by the engine 11. In this way, in a case where the SOC of the high-voltage battery 18 is low, the amount of electric power generated by the generator 17 can be increased to thereby increase the SOC of the high-voltage battery 18 and at the same time the amount of heat wasted by the engine 11 can be increased to thereby quickly increase the temperature of the coolant.

Still further, in the present embodiment, in a case where the operation limitation of the heat pump 26 is performed and where the SOC of the high-voltage battery 18 is higher than the predetermined value, the shaft efficiency reduction control is performed. In this shaft efficiency reduction control, the shaft efficiency of the engine 11 is reduced to thereby increase the waste heat generation efficiency of the engine 11. In this way, in a case where the remaining capacity of the high-voltage battery 18 is high, without much changing the output of the engine 11, the shaft efficiency of the engine 11 is reduced to thereby increase the waste heat generation efficiency of the engine 11, whereby the amount of heat wasted by the engine 11 can be increased and hence the temperature of the coolant can be quickly increased.

In this regard, the predetermined value used for determining whether or not the power generation amount increase control is performed may be set at a value different from the predetermined value used for determining whether or not the shaft efficiency reduction control is performed. In other words, in a case where the operation limitation of the heat pump 26 is performed and where the SOC of the high-voltage battery 18 is lower than a first predetermined value, the power generation amount increase control may be performed, whereas in a case where the operation limitation of the heat pump 26 is performed and where the SOC of the high-voltage battery 18 is higher than a second predetermined value which is higher than the first predetermined value, the shaft efficiency control may be performed.

Further, in the present embodiment, in a case where the operation limitation of the heat pump 26 is released, the output of the heat pump 26 is calculated by the use of the expression (1) to thereby set the output of the heat pump 26 according to the temperature and the flow rate of the coolant. In this way, in response to the fact that the output of the heat pump 26, which is necessary for controlling the temperature of the coolant to a target water temperature, changes according to the temperature and the flow rate of the coolant, the output of the heat pump 26 can be changed and the output of the heat pump 26 can be set to a suitable value. In this regard, a method for calculating the output of the heat pump 26 in a case where the operation limitation of the heat pump 26 is released may be changed as appropriate.

Further, in the present embodiment, in a case where it is determined that the heating priority command is given, the operation limitation of the heat pump 26 is released. However, the present disclosure is not limited to this, but the operation limitation of the heat pump 26 may be relaxed. For example, a control to stop the output of the heat pump 26 may be changed to a control to limit the output of the heat pump 26 to the upper limit value or lower, or the upper limit value of the output of the heat pump 26 may be changed to a higher value. However, the present disclosure may be changed in such a way that in a case where it is determined that the heating priority command is given, a processing of releasing or relaxing the operation limitation of the heat pump 26 may be omitted.

Still further, in the embodiment described above, it is determined on the base of the conditions (1) to (3) described above whether or not the heat radiation from the engine 11 to the atmosphere is high. However, the present disclosure is not limited to this, but a method for determining whether or not the heat radiation from the engine 11 to the atmosphere is high may be changed as appropriate. For example, an index to evaluate the heat radiation from the engine 11 to the atmosphere (for example, an amount of radiated heat) may be calculated on the basis of an output of a sensor to sense the temperature in the engine room or an output of a sensor to sense a temperature of the engine main body. Alternatively, the index to evaluate the heat radiation from the engine 11 to the atmosphere may be calculated on the basis of the rotational speed and a torque of the engine 11 and the temperature and the coolant flow rate. Still alternatively, it is also recommended to determine whether or not the heat radiation from the engine 11 to the atmosphere is high by comparing the calculated index with a determination value and to determine whether the output of the heat pump 26 is stopped or is limited to the upper limit value or lower. Still alternatively, the upper limit value of the output of the heat pump 26 may be set according to the calculated index.

However, in the present disclosure, a processing of determining whether or not the heat radiation from the engine 11 to the atmosphere is high may be omitted and in a case where the temperature of the coolant is lower than the predetermined value, the output of the heat pump 26 may be stopped at all times. Alternatively, in a case where the temperature of the coolant is lower than the predetermined value, the output of the heat pump 26 may be limited to the upper limit value or lower at all times.

Further, in a case where the operation limitation of the heat pump 26 is performed and where the SOC of the high-voltage battery 18 is lower than the predetermined value, the processing of performing the power generation amount increase control may be omitted, and in a case where the operation limitation of the heat pump 26 is performed and where the SOC of the high-voltage battery 18 is higher than the predetermined value, the processing of performing the shaft efficiency reduction control may be omitted.

Still further, in the embodiment described above, the heat pump is used as the heating unit to heat the coolant. However, the present disclosure is not limited to this, but for example, a PTC heater, a sheathed heater, a carbon heater, or a fuel burning heater may be used.

Still further, in the embodiment described above, the routine shown in FIG. 5 is executed by the hybrid ECU 39. However, the present disclosure is not limited to this, but the routine shown in FIG. 5 may be executed by the ECU other than the hybrid ECU 39 (for example, at least one of the engine ECU 40, the MG-ECU 41, and the air-conditioning ECU 42). Alternatively, the routine shown in FIG. 5 may be executed by both of the hybrid ECU 39 and the other ECU.

Still further, in the embodiment described above, a portion or all of functions performed by the ECU may be constructed of one IC or a plurality of ICs in the way of hardware. In addition, the present disclosure is not limited to the vehicle having the construction shown in FIG. 1 but may be applied to a vehicle having various kinds of constructions including an engine that is a power source of the vehicle and a heating unit to heat the coolant of the engine.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A vehicle control device for a vehicle, the vehicle including: an engine that is a power source of the vehicle; and a heat pump that heats a coolant of the engine, the vehicle control device comprising:
   an electronic control unit (ECU) configured to:
      determine whether or not a temperature of the coolant is lower than a predetermined value; and
      perform an operation limitation to limit the output of the heat pump to a predetermined upper limit value or lower, when the ECU determines that the temperature of the coolant is lower than the predetermined value,
   wherein when the ECU determines that the temperature of the coolant is the predetermined value or higher, the ECU is further configured to release the operation limitation performed on the heat pump, and perform control to start an output of the heat pump or to operate the output of the heat pump exceeding the predetermined upper limit value.

2. The vehicle control device according to claim 1, further comprising:
a heating device that uses a heat of the coolant, the heating device including a coolant circuit comprising an electric water pump and a heater core,
wherein the ECU is further configured to:
determine whether or not a heating priority command is given; and
when the ECU determines that the heating priority command is given, release or relax the operation limitation performed on the heat pump.

3. The vehicle control device according to claim 1, wherein the ECU is further configured to:
determine whether or not a heat radiation from the engine to atmosphere is high; and
when performing the operation limitation on the heat pump, determine whether to stop the output of the heat pump or to limit the output of the heat pump to the upper limit value or lower according to a result of the determination by the ECU.

4. The vehicle control device according to claim 1, wherein the ECU is further configured to:
increase an output of the engine to increase an amount of power generation by a generator, which is driven by a power of the engine, and to increase an amount of waste heat generated by the engine, when the operation limitation is performed on the heat pump and a remaining capacity of a battery disposed in the vehicle is lower than a predetermined value.

5. The vehicle control device according to claim 1, wherein the ECU is further configured to:
reduce a shaft efficiency, which is a ratio of a shaft output to an amount of fuel consumed by the engine, to increase a waste heat generation efficiency, which is a ratio of an amount of waste heat generated by the engine to the amount of fuel consumed by the engine, when the operation limitation is performed on the heat pump and a remaining capacity of a battery disposed in the vehicle is higher than a predetermined value.

6. The vehicle control device according to claim 1, wherein when the ECU releases the operation limitation performed on the heat pump, the ECU is further configured to:
set the output of the heat pump according to the temperature and a flow rate of the coolant.

* * * * *